(12) United States Patent
Sridharan et al.

(10) Patent No.: US 7,529,275 B2
(45) Date of Patent: May 5, 2009

(54) DATA TRANSFER PROTOCOL FOR 6.25 GBPS SERIALIZER/DESERIALIZER (SERDES)

(75) Inventors: Anand Sridharan, Santa Clara, CA (US); Srirajkumar Sundararaman, San Jose, CA (US); Manjunath Duntoor, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 656 days.

(21) Appl. No.: 11/176,926

(22) Filed: Jul. 7, 2005

(65) Prior Publication Data

US 2007/0008991 A1    Jan. 11, 2007

(51) Int. Cl.
*H04L 7/00* (2006.01)
(52) U.S. Cl. .................. 370/514; 375/354
(58) Field of Classification Search ........ 370/514; 375/354; 341/50
See application file for complete search history.

(56) References Cited

U.S. PATENT DOCUMENTS

| | | | |
|---|---|---|---|
| 6,662,332 B1 * | 12/2003 | Kimmitt | 714/762 |
| 6,721,313 B1 | 4/2004 | Van Duyne | |
| 6,771,611 B1 * | 8/2004 | Garg | 370/272 |
| 7,161,955 B1 * | 1/2007 | Zeng et al. | 370/466 |
| 7,230,549 B1 * | 6/2007 | Woodral et al. | 341/52 |
| 7,236,544 B2 * | 6/2007 | Williams et al. | 375/316 |
| 7,388,881 B2 * | 6/2008 | Baliga et al. | 370/466 |
| 2005/0149813 A1 * | 7/2005 | Coles et al. | 714/746 |
| 2007/0101241 A1 * | 5/2007 | Hoyer | 714/776 |
| 2007/0168835 A1 * | 7/2007 | Amrutur et al. | 714/758 |

* cited by examiner

*Primary Examiner*—Melvin Marcelo
(74) *Attorney, Agent, or Firm*—Trellis IP Law Group, PC (57) ABSTRACT

A method and a system for communicating data packets over a data bus is provided. The method includes sending one or more delimiter lines, a delimiter line comprising 'N' number of characters, the characters being sent for clock recovery; scrambling the data packets; sending the scrambled data packets after the delimiter line; sending at least one intra-packet within the data packets, the intra-packet being a packet within packets, the intra-packet including 'control' information; sending one or more delimiter lines after sending the scrambled data packets; and descrambling them.

22 Claims, 4 Drawing Sheets

DATA TRANSFER PROTOCOL FOR 6.25 GBPS SERIALIZER/DESERIALIZER (SERDES)

BACKGROUND OF THE INVENTION

1. Field of Invention

Embodiments of the invention relate in general to a data transfer protocol. More specifically, the embodiments of the invention relate to methods and systems defining rules for the transmission of data, and synchronization and alignment of a receiver and a transmitter.

2. Description of the Background Art

Transmission of data across the backplane of a high-speed interface, e.g., 6.25 Gbps on a Serializer/Deserializer (SERDES), involves transfer of bit patterns in the form of packets (henceforth referred to as 'payload'). The SERDES has a Decision Feedback Equalizer (DFE) circuit at the receiver. The DFE circuits maintain signal integrity and reduce bit error rates. However, the presence of extended idle bit patterns, such as continuous 0s or 1s, and intra packet gaps (IPGs) on a bus results in impairment in clock recovery and disturbances in DFE adaptation. A conventional protocol cannot avoid the extended idle bit patterns on the bus. In order to avoid these extended idle bit patterns, a protocol should define mechanisms for scrambling the payload at the interface of the transmitter. Scrambling is also necessary to avoid "intersymbol interferences." An intersymbol interference is the distortion in the temporal spreading of the received signal. This distortion results in the overlap of the individual pulse of the signal, to the extent that the receiver cannot distinguish between changes of state, i.e., individual signal elements. Therefore, intersymbol interference compromises the integrity of the received payload. Further, if erroneous patterns are introduced after scrambling, descrambling the payload becomes difficult. The protocol should enable easier and faster recovery of the error, so that it is not propagated from one corrupted payload to subsequent payloads. Moreover, the mechanisms for scrambling payloads should be compatible with any coding scheme, without compromising the alignment scheme of the payload. Furthermore, the protocol should allow the extended idle bit patterns and intra packet special patterns to be sent within a packet.

During the unavailability of bandwidth in an Integrated Circuit such as an Application Specific Integrated Circuit (ASIC), the protocol communicates with the receiver and the transmitter to stall the transmission of packets. The protocol performs dynamic updating of the state information pertaining to the payload, thereby ensuring protocol active hardware clock recovery. Active hardware clock recovery results in improved data integrity and reduced bit error rates. Furthermore, the protocol ensures a higher level of control information for synchronous data transfer.

Existing protocols such as the Ethernet Protocol and the Cisco Protocol do not support the introduction of extended idle bit patterns and IPG during transmission of the payload. Moreover, none of the existing protocols avoid transmission of extended bit patterns when there is no traffic on the bus. These protocols do not also enable dynamic, easier and faster error recovery during transmission of the payload.

One of the existing algorithms for scrambling the payload randomizes the payload, based on the output bit that precedes it by N-bit positions. However, in the event of a transmission error, multiple errors may be produced in the descrambled data. The transmission error also propagates across frames.

Another scrambling algorithm defines a mechanism for sending the scrambling state of the transmitter through state synchronization messages. These messages are minimal size packets containing the state. However, these packets consume additional bandwidth and add an Inter Packet Group (IPG) overhead to packet transmission interfaces. Moreover, if there is a corruption in the state, it results in improper descrambling of the packets, which can be corrected only when the next message arrives.

DETAILED DESCRIPTION OF EMBODIMENTS OF THE INVENTION

The various embodiments of the invention provide a method, a system, and a computer-readable medium for communication of data packets on a data bus. Data packets are communicated over the data-link layer by using a protocol. In the protocol, control and data characters are encoded on a serial stream of data that is transmitted. The serial stream consists of lines, wherein the lines are a set of characters. An idle line consists of delimiter characters, which can also be used to achieve byte alignment or line alignment. A data packet is encapsulated within two delimiter lines. If a transmitter does not have bytes to send in the middle of a packet, it can send stuff lines indicating an intra packet special pattern. This gap can be used by the protocol to send control information. Stuff lines can also be sent when a receiver requests the transmitter to stop sending data in the middle of a packet. Moreover, the protocol can avoid long idle patterns of data by sending a locking pattern. The locking pattern consists of lockings characters, which can be ignored by the receiver. The idle patterns of data can also be used by the protocol to send control information, using control characters. Furthermore, the protocol enables synchronous transmission of the data packets by scrambling the payload. The seed for every data packet that is scrambled is random.

Figure 1:
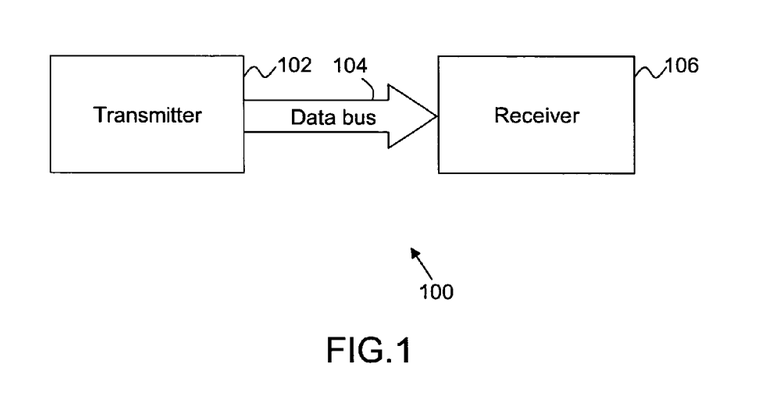
FIG. 1 illustrates an environment wherein an embodiment of the invention can be practiced.

FIG. 1 illustrates an environment 100, in accordance with an exemplary embodiment of the present invention. Environment 100 includes a transmitter 102, a data bus 104, and a receiver 106. Transmitter 102 can be an electronic device that transmits information over a communicating medium to a receiver. The information can either be transmitted through a wire, optical fiber, or as electromagnetic wave signals. Examples of electromagnetic wave signals include microwave, infrared and radio signals. Receiver 106 can be an electronic device that receives the information sent by transmitter 102. Transmitter 102 transmits the data packets on data bus 104 to receiver 106. According to various embodiments of the invention, a data packet can contain bits that represent a header, the payload, and a trailer. The header contains information pertaining to handling the payload. The payload contains the actual data the packet delivers to a destination. The trailer contains control information for the protocol, and indicates the end of the payload and the data packet. The data packet can be referred to by other names, such as frame, block, cell or segment. Each data packet is in the form of a plurality of characters. The characters can be encoded, using one of the various character-encoding schemes that are available. Examples of character-encoding schemes that can be used in accordance with various embodiments of the invention include ASCII, Unicode, and the 8B10B-encoding scheme. 8B10B is a line code that maps 8-bit symbols to 10-bit symbols to achieve DC balance and bounded disparity. The 8 bits of data are transmitted as a 10-bit entity known as a character. The lower 5 bits of data are encoded into a 6-bit group and the top 3 bits are encoded into a 4-bit group. These code groups are chained together to form the 10-bit character that is transmitted on the data bus. The communication between transmitter 102 and receiver 106 takes place according to the protocol of the various embodiments of the invention—protocols are standards that define the connection, communication and transfer of data between two data-processing units. Protocols can be implemented by hardware, software, or the combination of both. Exemplary protocols include Synchronous Optical Network (SONET) and Ethernet. In accordance with an exemplary embodiment of the invention, the transmitter transmits data packets to the receiver, using the communication protocol according to the various embodiments of the invention, over the 6.25 Gbps Serializer/Deserializer (SERDES) across the back plane in the serial link. The SERDES is an Integrated Circuit (IC) transceiver that converts parallel data to serial data, and vice-versa. The transmitter in the SERDES is a parallel-to-serial converter, and the receiver is a serial-to parallel converter. The SERDES link facilitates the communication of parallel data between two points over serial streams.

Data bus 104 is a collection of wires through which instructions and/or data is transmitted within or to and from a processing unit or a storage device. Each wire is capable of communicating one bit at a time. Examples of data bus 104 include, but are not limited to, an internal data bus, a local data bus, a wide data bus to a memory, and an expansion data bus. The memory includes a Cache Memory, a Flash Memory, a Random Access Memory, an Erasable Programmable Read Only Memory, a Non-volatile Random Access Memory, etc.

Figure 2:
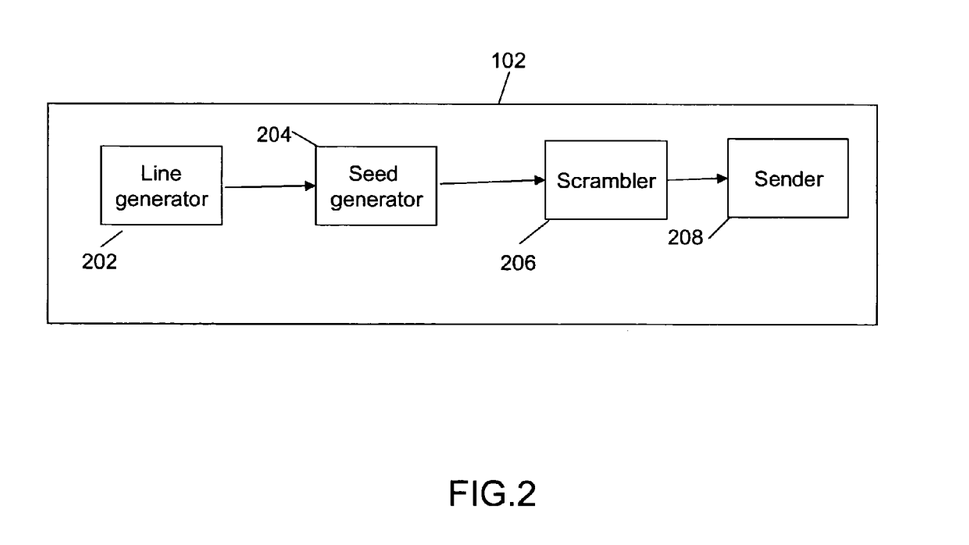
FIG. 2 illustrates a system for transmission of data packets by a transmitter, in accordance with an exemplary embodiment of the present invention.

FIG. 2 illustrates a system for transmission of data packets by a transmitter, in accordance with an exemplary embodiment of the present invention. Transmitter 102 comprises a line generator 202, a seed generator 204, a scrambler 206, and a sender 208 According to the various embodiments of the invention, line generator 202 generates one or more delimiter lines, data packets, and control lines. A line can be defined as a set of characters. In an exemplary embodiment of the invention, a line consists of four characters. Different characters may represent different functions. According to the various embodiments of the invention, characters can be delimiter characters, stuff characters, locking characters, and control characters. A line beginning and ending with delimiter characters can be called a delimiter line. Similarly, there can be stuff lines, locking patterns, and control lines. The delimiter lines demarcate the data packet boundaries, which can also be called inter packet gaps. The delimiter-lines also represent an idle bit sequence. According to various embodiments of the invention, random characters can be inserted between the first and last delimiter characters of a delimiter line. For example, a delimiting line with four characters can be represented as 'DELM md rnd DELM'. Here, DELM represents a delimiter character and rnd represents a random character. Random characters avoid long streams of idle patterns. Another exemplary delimiter character can be DELM-A. In the various embodiments of the invention, for a four-character line, this character may be used to fill a data packet that ends in a non-four-byte boundary. For example, a packet that ends in a non-four-byte boundary can be included in a line as 'pkt pkt DELM DELM-A'. Here, 'pkt' represents the information in the data packet. Therefore, for a four-character line using 8B10B encoding, DELM-A can be used to achieve 10-bit alignment of characters and 4-character alignment of lines. According to an embodiment of the invention, DELM-A can be the K28.5 character for the 802.3z protocol.

A packet can be encapsulated within two delimiter lines. Therefore, a data packet starts after a delimiter line. The lines containing the data packets can be called the data lines. The end of a data line can also be indicated by another delimiter line that follows the data line. An example of a data line can be 'pkt pkt pkt pkt'. If transmitter 102 does not have any bytes to send in the middle of the packet, it can send one or more stuff lines. An example of a stuff line can be 'STUFF rnd rnd STUFF'. Here, 'STUFF' represents a stuff character and 'rnd' a random character. Therefore, a stuff line can indicate an intra packet special pattern. According to various embodiments of the invention, a stuff line can also be transmitted when the receiver requests the transmitter to stop sending data in the middle of a packet. The protocol can avoid long idle patterns of data by sending a locking pattern. The locking pattern includes a random data pattern encapsulated within lock begin and end lines. The receiver ignores the locking pattern. An exemplary lock line can be 'LOCK rnd rnd LOCK'. Here, 'LOCK' represents a lock character and 'rnd' the random character. The idle time within a packet can be used to transmit control information embedded in the control lines. Control information can also be sent anytime within a packet even if there is no idle time. According to various embodiments of the invention, the control characters in a control line can include information relating to the sequence, alignment, and decoding of the data packets or the internal state of the transmitter. An exemplary control line can be 'CTRL ctdata ctdata CTRL', where CTRL represents a control character and ctdata represents the control information.

Data packets sent through line generator 202 can be scrambled. According to various embodiments of the invention, the seed for every data packet that is scrambled is random. The seeds for scrambling the data packets can be dynamically generated by seed generator 204. In the various embodiments of the invention, seed generator 204 generates a state with every clock. According to the embodiments of the invention that use four-character lines, seed generator 204 may include a 16-bit PRBS generator that produces a 16-bit state. This state can be embedded into the stream and forwarded during the transmission of delimiter lines. An exemplary pattern on the interface between transmitter 102 and receiver 106 that has the states embedded in the delimiter lines can look like the following pattern:

| | |
|---|---|
| DELM state1 state1 DELM | |
| DELM state2 state2 DELM | // Idle |
| pkt pkt pkt pkt | |
| pkt pkt pkt pkt | |
| pkt pkt pkt pkt | |
| DELM state3 state3 DELM | // IPG |
| pkt pkt pkt pkt | |
| pkt pkt pkt pkt | |
| DELM state4 state4 DELM | // IPG |

Where 'state 1', 'state 2' 'state 3', and 'state 4' can be the different embedded states generated by the sequence generator of seed generator 204. Furthermore, this state is used to initialize the sequence generators within scrambler 206.

Scrambler 206 scrambles the data packets—scrambling is a process that encodes the data packets so that repetitive bit patterns are eliminated from the bit stream. The repetitive bit patterns can concentrate energy at specific frequencies, resulting in intersymbol interferences. Scrambling spreads energy over a wider frequency range, eliminating intersymbol interference. Scrambler 206 includes a 32-bit PRBS sequence generator, initialized with the latest 16-bit state. Therefore, scrambler 206 re-initializes its sequence generator with a new state every time the delimiter is transmitted. A scrambled data packet is a function of the actual data packet with the 32-bit random number produced by the PRBS sequence generator. According to an exemplary embodiment of the invention, the scrambling function is an XOR gate. According to another exemplary embodiment of the invention, the data packets are scrambled in order to avoid extended idle bit patterns, such as continuous 0s or 1s and intra packet gaps (IPG) on data bus 104. During the process of scrambling, the extended bit patterns are combined with a sequence in random order. This eliminates the occurrence of continuous 0s or 1s. The scrambled data packets are transmitted by sender 208. Sender 208 transmits the delimiter lines, the scrambled data packets, and the control lines to receiver 106. An exemplary pattern on the interface between transmitter 102 and receiver 106 that includes scrambled data packets can look like the following:

```
DELM state1 state1 DELM
DELM state2 state2 DELM
scr_pkt scr_pkt scr_pkt scr_pkt      // scrambled data packets
scr_pkt scr_pkt scr_pkt scr_pkt
scr_pkt scr_pkt scr_pkt scr_pkt
DELM state3 state3 DELM
scr_pkt scr_pkt scr_pkt scr_pkt
scr_pkt scr_pkt scr_pkt scr_pkt
DELM state4 state4 DELM
``` where, 'scr_pkt' represents a character in a scrambled data packet.

Figure 3:
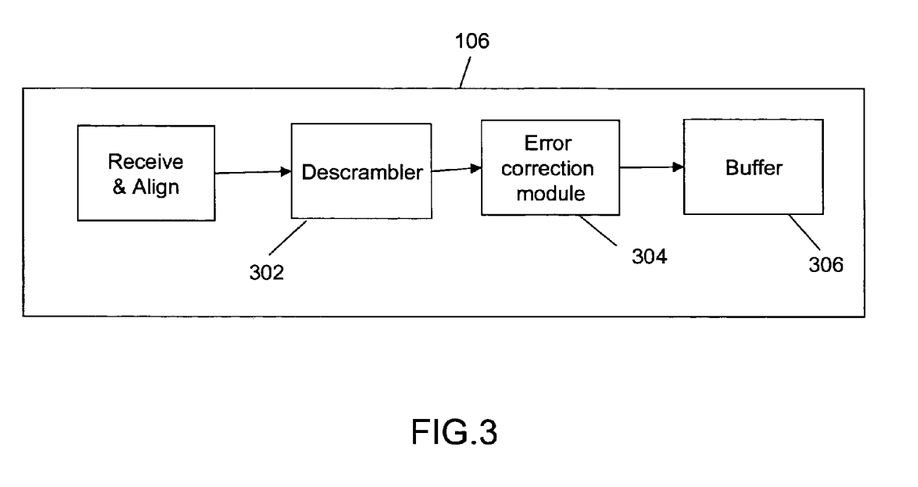
FIG. 3 illustrates a system for receiving the data packets, in accordance with an exemplary embodiment of the present invention.

FIG. 3 illustrates a system for receiving the data packets, in accordance with an exemplary embodiment of the present invention. Receiver 106 includes a descrambler 302, an error correction module 304, and a buffer 306. Descrambler 302 descrambles the data packets that are sent by the sender 208 on the basis of the state seeded by seed generator 204. Descrambler 302 includes a 32-bit PRBS sequence generator. This PRBS sequence generator is initialized with the latest 116-bit state received from the state provided in the delimiter lines. Therefore, descrambler 302 re-initializes its sequence generator with each new state that is transmitted in the delimiter lines. The PRBS generator, initialized with the latest state received, produces an identical 32-bit random sequence every clock, like that produced by the PRBS sequence generator of scrambler 206. Moreover, since the same state is used by scrambler 206 and descrambler 302, they are re-synchronized at every packet boundary. Following receipt of the scrambled data packets, descrambler 302 performs an inverse function on the received scrambled data packets to obtain the actual data packets. In an exemplary embodiment, if the XOR function is used to scramble the data packets, descrambler 302 uses the same function to descramble the data packets.

If the embedded state or data packet is corrupted during transmission, a new state is loaded for the next packet. This ensures that the next packet is descrambled correctly. In an embodiment, the new state can be loaded by error correction module 304. Error correction module 304 enables fast recovery of correct data packets. Further, it prevents the error from propagating across data packets. According to an exemplary embodiment, buffer 306 is used at receiver 106 to store the descrambled data packets sent by transmitter 102. Examples of buffer 306 include Random Access Memory (RAM), and Non-volatile Random Access Memory.

Figure 4:
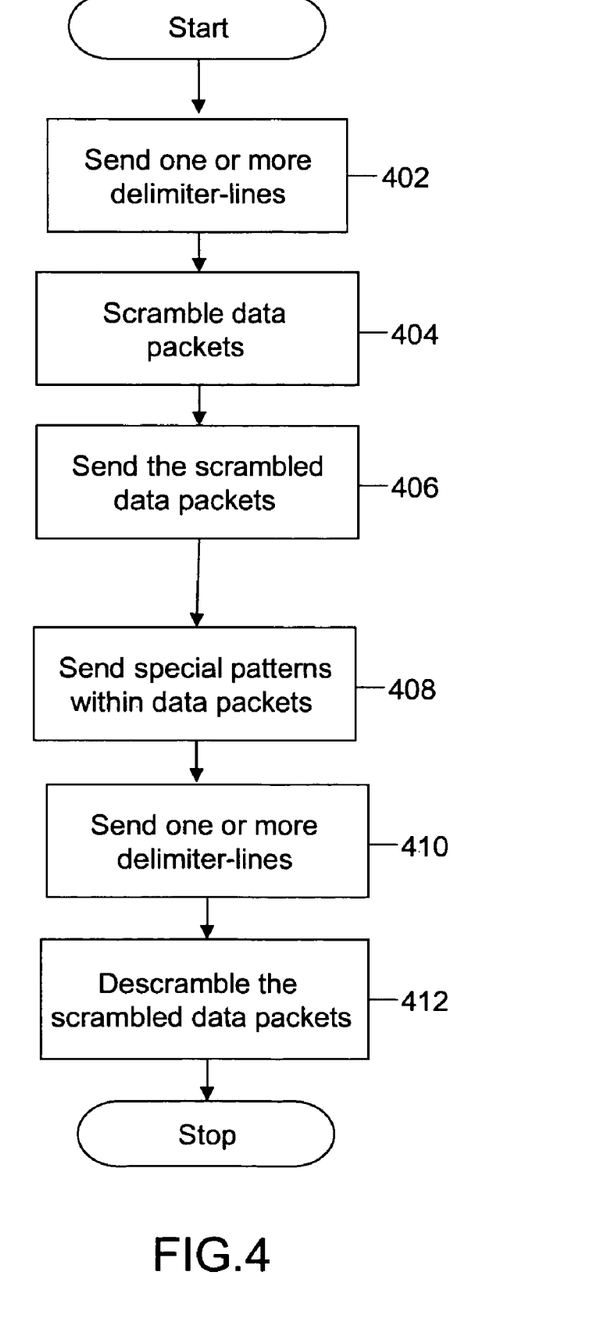
FIG. 4 illustrates a flowchart depicting a method for communicating data packets on a data bus, in accordance with an exemplary embodiment of the present invention.

FIG. 4 illustrates a flowchart depicting a method for communicating data packets on the data bus, in accordance with an exemplary embodiment of the present invention. At step 402, sender 208 sends one or more delimiter lines to receiver 106. According to the various embodiments of the invention, a new state can also be sent within the delimiter line. At step 404, scrambler 206 scrambles the data packets. At step 406, sender 208 sends the scrambled data packets to receiver 106. At step 408, sender 208 sends special patterns in the scrambled data packet. The special patterns sent in the scrambled data packet can be called an intra-packet. According to an exemplary embodiment, an intra-packet includes a stuff line. In various other embodiments of the invention, the intra packet may contain a locking pattern or a control line. A stuff line indicates an intra-packet gap (IPG). A stuff line is sent when transmitter 102 does not have bytes to send in the middle of a data packet. A stuff line includes stuff characters, which can be sent in a data packet. Therefore, the stuff line eases the buffer requirements of an integrated circuit and can also be sent to receiver 106 when receiver 106 requests transmitter 102 to stop sending data in the middle of a data packet.

The locking pattern is sent to avoid sending long streams of idle bit pattern on data bus 104. The locking pattern can be a random data pattern encapsulated between a locking 'begin' and 'end' line. The control line can also be sent in between the beginning and end of a locking pattern. When a delimiter line is transmitted from transmitter 102 to receiver 106, seed generator 204 seeds the delimiter line with a state. At step 410, sender 208 sends one or more delimiter lines to receiver 106. At step 412, descrambler 302 descrambles the data packets sent by transmitter 102 on the basis of the state embedded in the last received delimiter line. At receiver 106, descrambler 302 is also initialized with this state. Therefore, scrambler 206, and descrambler 302 are synchronized at every data packet boundary. Moreover, the respective PRBS sequence generators of scrambler 206 and descrambler 302 are also initialized with the same state. At the time of the transmission or reception of the data packet, scrambler 206 and descrambler 302 use the sequence generated by their respective PRBS generator, to scramble and descramble the data packets.

Figure 5:
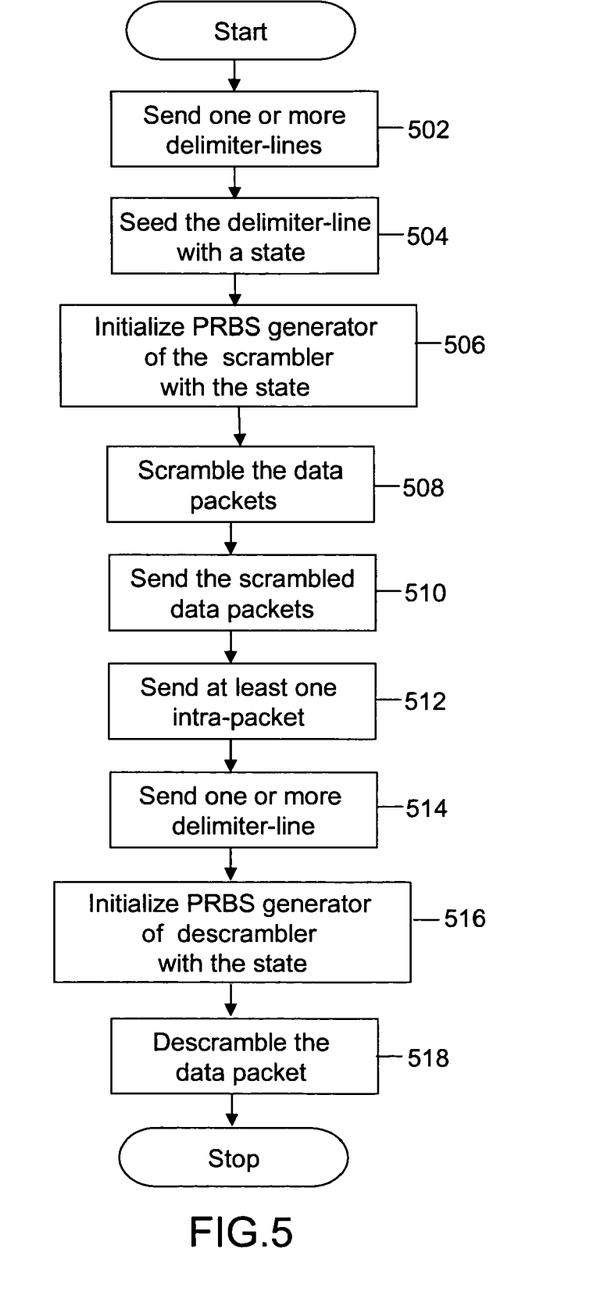
FIG. 5 illustrates a flowchart depicting another method for communicating data packets on the data bus, in accordance with another exemplary embodiment of the invention.

FIG. 5 illustrates a flowchart depicting another method for communicating data packets on the data bus, in accordance with another exemplary embodiment of the invention. At step 502, sender 208 sends one or more delimiter lines. At step 504, seed generator 204 seeds the delimiter lines with a state. At step 506, the PRBS generator of scrambler 206 is initialized with the state. At step 508, scrambler 206 scrambles the data packets on the basis of this state. At step 510, sender 208 sends the scrambled data packets to receiver 106. At step 512, sender 208 sends at least one intra-packet to receiver 106—an intra-packet includes a stuff line, a locking pattern, and a control line. A stuff line indicates an IPG and it is sent when transmitter 102 does not have bytes to send in the middle of a data packet. The stuff line is also sent to receiver 106 when receiver 106 requests transmitter 102 to stop sending data in the middle of a data packet. At step 514, sender 208 sends one or more delimiter lines to receiver 106—the delimiter-line is sent after the completion of a data packet. At step 516, the PRBS generator of descrambler 302 is initialized with the state. At step 518, receiver 106 descrambles the data packets on the basis of the state.

Various embodiments of the invention provide a protocol for dynamic synchronization of a receiver and a transmitter. This is achieved by seeding the delimiter line with a new state every time a delimiter line is transmitted. The scrambler and descrambler re-initialize their sequence generators with this new state every time. Thereby, the scrambler and descrambler are re-synchronized at each packet boundary, and their sequence generators produce exactly the same sequence. Errors in data communication are also significantly reduced. This is because a new state is loaded by the descrambler for the next data packet, which ensures that the next data packet is correctly descrambled. No extra bandwidth is required to transmit the state synchronization packets. Furthermore, propagation of error in further data packets is removed. Moreover, scrambling the data packets enables effective clock recovery and prevention of intersymbol interferences in data packets. Since the scrambler state is generated dynamically, it is very difficult to reverse engineer a packet that would produce constant packets after scrambling. Furthermore, a method for sending intra-packet gap (IPG) is also provided according to the various embodiments of the present invention. The scrambling technique described in the various embodiments of the invention can be used with any encoding scheme, without compromising on the Direct Current balance or alignment scheme.

Although the invention has been discussed with respect to specific embodiments thereof, these embodiments are merely illustrative, and not restrictive, of the invention. For example, a 'method for communicating data packets on a data bus' can include any type of analysis, manual or automatic, to anticipate the needs for communicating data packets on a data bus.

Although specific protocols have been used to describe embodiments, other embodiments can use other transmission protocols or standards. Use of the terms 'peer', 'client', and 'server' can include any type of device, operation, or other process. The present invention can operate between any two processes or entities including users, devices, functional systems, or combinations of hardware and software. Peer-to-peer networks and any other networks or systems where the roles of client and server are switched, change dynamically, or are not even present, are within the scope of the invention.

Any suitable programming language can be used to implement the routines of the present invention including C, C++, Java, assembly language, etc. Different programming techniques such as procedural or object oriented can be employed. The routines can execute on a single processing device or multiple processors. Although the steps, operations, or computations may be presented in a specific order, this order may be changed in different embodiments. In some embodiments, multiple steps shown sequentially in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing.

In the description herein for embodiments of the present invention, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

Also in the description herein for embodiments of the present invention, a portion of the disclosure recited in the specification contains material, which is subject to copyright protection. Computer program source code, object code, instructions, text or other functional information that is executable by a machine may be included in an appendix, tables, figures or in other forms. The copyright owner has no objection to the facsimile reproduction of the specification as filed in the Patent and Trademark Office. Otherwise all copyright rights are reserved.

A 'computer' for purposes of embodiments of the present invention may include any processor-containing device, such as a mainframe computer, personal computer, laptop, notebook, microcomputer, server, personal data manager or 'PIM' (also referred to as a personal information manager), smart cellular or other phone, so-called smart card, set-top box, or any of the like. A 'computer program' may include any suitable locally or remotely executable program or sequence of coded instructions, which are to be inserted into a computer, well known to those skilled in the art. Stated more specifically, a computer program includes an organized list of instructions that, when executed, causes the computer to behave in a predetermined manner. A computer program contains a list of ingredients (called variables) and a list of directions (called statements) that tell the computer what to do with the variables. The variables may represent numeric data, text, audio or graphical images. If a computer is employed for presenting media via a suitable directly or indirectly coupled input/output (I/O) device, the computer would have suitable instructions for allowing a user to input or output (e.g., present) program code and/or data information respectively in accordance with the embodiments of the present invention.

A 'computer readable medium' for purposes of embodiments of the present invention may be any medium that can contain, store, communicate, propagate, or transport the computer program for use by or in connection with the instruction execution system apparatus, system or device. The computer readable medium can be, by way of example only but not by limitation, an electronic, magnetic, optical, electromagnetic, infrared, or semiconductor system, apparatus, system, device, propagation medium, or computer memory.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Further, at least some of the components of an embodiment of the invention may be implemented by using a programmed general-purpose digital computer, by using application specific integrated circuits, programmable logic devices, or field programmable gate arrays, or by using a network of interconnected components and circuits. Connections may be wired, wireless, by modem, and the like.

It will also be appreciated that one or more of the elements depicted in the drawings/figures can also be implemented in a more separated or integrated manner, or even removed or rendered as inoperable in certain cases, as is useful in accordance with a particular application.

Additionally, any signal arrows in the drawings/Figures should be considered only as exemplary, and not limiting, unless otherwise specifically noted. Combinations of components or steps will also be considered as being noted, where terminology is foreseen as rendering the ability to separate or combine is unclear.

As used in the description herein and throughout the claims that follow, "a", an and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

What is claimed is:

1. A method for communicating data packets on a data bus, the method comprising:
   sending one or more delimiter-lines, a delimiter-line comprising 'N' number of characters, the characters being sent for clock recovery;
   scrambling the data packets;
   sending the scrambled data packets after the delimiter line;
   sending at least one intra-packet, an intra-packet being a packet within a data packet;
   sending one or more delimiter-lines after the scrambled data packets; and
   descrambling the scrambled data packets.

2. The method of claim 1, wherein each of the sending one or more delimiter-lines further comprises:
   sending at least two delimiting characters in a delimiter line, each of the two delimiting characters being placed at the beginning and the end of the delimiter-line; and
   sending additional characters, the additional characters being placed between the two delimiting characters.

3. The method of claim 2, wherein the sending the additional characters comprises sending a state, the state indicating the state of the transmitter at the instant of sending the data packet.

4. The method of claim 2, wherein the sending the additional characters comprises sending random bits.

5. The method of claim 1, wherein the sending at least one intra-packet comprises sending a stuff line, the stuff line indicating an intra packet special pattern.

6. The method of claim 1, wherein the sending at least one intra-packet comprises sending a locking pattern, the locking pattern being a random data pattern, the locking pattern being sent for clock recovery.

7. The method of claim 1, wherein the sending at least one intra-packet comprises sending a control line; the control line comprising control characters.

8. The method of claim 1, wherein the scrambling the data packets comprises seeding the delimiter-line with a state, the state defining an instantaneous state of the transmitter, the scrambling being performed on the basis of the state.

9. The method of claim 1, wherein the descrambling the scrambled data packets comprises descrambling the scrambled data packets on the basis of a state, the state defining an instantaneous state of the transmitter, the state being seeded in the delimiter-line during scrambling.

10. The method of claim 1, wherein the sending the scrambled data packets comprises filling 'n' bytes with delimiting characters if any data packet ends with a (N-n) byte boundary.

11. The method of claim 1, wherein the sending the scrambled data packets comprises encoding the characters.

12. The method of claim 11, wherein the encoding can be performed using an 8b10b encoding.

13. A method for communicating data packets, the method comprising:
   sending one or more delimiter-lines, a delimiter-line comprising 'N' number of characters, the characters being sent for ensuring clock recovery;
   seeding the delimiter-line with a state, the state defining an instantaneous clock;
   scrambling the data packets, the scrambling being performed on the basis of the state;
   sending the scrambled data packets;
   sending at least one intra-packet, an intra-packet being a packet within a data packet;
   sending one or more delimiter-line after sending the data packets; and
   descrambling the data packets, the descrambling being performed on the basis of the state.

14. The method of claim 13, wherein the scrambling is performed by a plurality of exclusive-OR gates.

15. The method of claim 13, wherein the descrambling is performed by a plurality of exclusive-OR gates.

16. The method of claim 13, wherein the method further comprises loading a new state if at least one of the seeded state and the data packet becomes corrupted during sending.

17. An apparatus for communicating data packets on a data bus, the apparatus comprising:
   a transmitter for transmitting data packets, the transmitter comprising:
   a line generator, the line generator generating one or more delimiter-lines, the delimiter-line comprising 'N' number of characters, the characters being sent for clock recovery;

a seed generator, the seed generator seeding a state on the delimiter line, the state defining an instantaneous clock;

a scrambler, the scrambler scrambling the data packets;

a sender, the sender sending the delimiter-lines, and the data packets; and a receiver, the receiver receiving the data packets transmitted by the transmitter, the receiver comprising:

a descrambler, the descrambler descrambling the scrambled data packets.

18. The apparatus of claim 17, wherein the receiver further comprises a buffer for providing buffer to the data packets.

19. The apparatus of claim 17, wherein the apparatus further comprises an error correction module, the error correction module loads a new state on the delimiter line if at least one of the seeded state and the delimiter line is corrupted during transmission.

20. The apparatus of claim 17, wherein the apparatus further comprises a randomizer, the randomizer randomizes the delimiter-line and a stuff line with random bytes, the stuff line indicating an intra packet special pattern.

21. A system for communicating data packets on a data bus, the system comprising:

means for sending one or more delimiter-lines, a delimiter-line comprising 'N' number of characters, the characters being sent for clock recovery;

means for seeding the delimiter-line with a state, the state defining an instantaneous clock;

means for initializing a scrambler with the state, the scrambler scrambling the data packets on the basis of the state;

means for scrambling the data packets;

means for sending the scrambled data packets;

means for sending at least one intra-packet, an intra-packet being a packet within a data packet, the intra-packet including 'control' information;

means for sending one or more delimiter-lines after the data packets; and means for descrambling the data packets, the descrambling being performed on the basis of the state.

22. An apparatus for communicating data packets on a data bus, the apparatus comprising a processing system including a processor coupled to a display and user input device;

a machine-readable medium including instructions executable by the processor comprising one or more instructions for sending one or more delimiter-lines, a delimiter-line comprising 'N' number of characters, the characters being sent for clock recovery;

one or more instructions for seeding the delimiter-line with a state, the state defining an instantaneous clock;

one or more instructions for initializing a scrambler with the state, the scrambler scrambling the data packets on the basis of the state;

one or more instructions for scrambling the data packets;

one or more instructions for sending the scrambled data packets;

one or more instructions for sending at least one intra-packet, an intra-packet being a packet within a data packet, the intra-packet including 'control' information;

one or more instructions for sending one or more delimiter-lines after sending the data packets; and one or more instructions for descrambling the data packets, the descrambling being performed on the basis of the state.

* * * * *